United States Patent
de Moura et al.

(10) Patent No.: US 7,925,476 B2
(45) Date of Patent: Apr. 12, 2011

(54) MODEL-BASED THEORY COMBINATION

(75) Inventors: Leonardo M. de Moura, Sammamish, WA (US); Nikolaj S. Bjorner, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 12/019,500

(22) Filed: Jan. 24, 2008

(65) Prior Publication Data

US 2009/0192767 A1      Jul. 30, 2009

(51) Int. Cl.
*G06F 7/60* (2006.01)
*G06F 17/10* (2006.01)

(52) U.S. Cl. .......................................................... 703/2

(58) Field of Classification Search ........................ 703/2
See application file for complete search history.

(56) References Cited

U.S. PATENT DOCUMENTS

| | | | |
|---|---|---|---|
| 2004/0049474 A1 | 3/2004 | Shankar et al. |
| 2006/0190865 A1 | 8/2006 | Yu et al. |
| 2006/0236311 A1 | 10/2006 | Chang et al. |
| 2007/0005633 A1 | 1/2007 | Ball et al. |
| 2007/0074152 A1 | 3/2007 | Roe |

OTHER PUBLICATIONS

Nieuwenhuis et al. "Solving SAT and SAT Module Theories: From an Abstract Davis-Putnam-Logemann-Loveland Procedure to DPLL(T)" 2006 ACM.*

Dutertre et al. "A Fast Linear-Arithmetic Solver for DPLL(T)*", SPringer Verlag Berlin Hiedelberg 2006.*
Ting, Kai Ming, et al., "Theory Combination: an alternative to Data Combination", 1996, 22 pages.
Bozzano, Marco, et al., "Efficient Theory Combination via Boolean Search", Aug. 12, 2005, 38 pages.
Ting, Kai Ming, et al., "Model Combination in the multiple-data-batches scenario", 1997, 16 pages.
Tinelli, Cesare, et al., "A New Correctness Proof of the Nelson-Oppen Combination Procedure", 1996, 17 pages.
Shostak, Robert E., "Deciding Combinations of Theories", Journal of the Association for Computing Machinery, vol. 31, No. 1, Jan. 1984, 12 pages.
Bozzano, Marco, et al., "Efficient Satisfiability Modulo Theories via Delayed Theory Combination", Proceedings of CAV 2005, Lecture Notes in Computer Sciences, vol. 3576, Springer, Berlin, 2005, 14 pages.

* cited by examiner

*Primary Examiner* — Kamini S Shah
*Assistant Examiner* — Saif A Alhija
(74) *Attorney, Agent, or Firm* — Workman Nydegger

(57) ABSTRACT

A method is described for combining models of a plurality of theory solvers in order to produce a model which may be satisfiable by each of the plurality of theory solvers. A model is accessed for a first theory solver which is satisfiable in the first theory solver. It is determined that one or more equalities are implied by the model and it is determined if the equalities are compatible with a second solver. The model is updated in accordance any equalities determined not to be compatible with the second solver. A method is also described for mutation of models using freedom intervals. A freedom interval is determined for a variable within a model and the model is updates by choosing a value for the variable which lies within the freedom interval.

20 Claims, 3 Drawing Sheets

MODEL-BASED THEORY COMBINATION

CROSS-REFERENCE TO RELATED APPLICATIONS

N/A

BACKGROUND

Computer programs and software are ubiquitous and are used not just to direct the functionality of conventional computers but also to control and enhance the functionality of a myriad of modern products and appliances. For instance, televisions, household appliances, cellular phones, automobiles, medical devices, and so forth, may incorporate computer programs which direct and enhance their functionality. The theoretical and practical analysis of computer programs is an important aspect of software research, development, modification, enhancement, and maintenance. The ability to analyze computer programs and reason about their execution, from both theoretical and practical perspectives, aids software developers by allowing them to make better and more informed choices during development of software and the modification or enhancement of existing software. Analysis of software is useful for proving correctness of code, for performing optimizations of existing code, for doing performance analysis and so on.

For purposes of analysis, it is often efficient and desirable to automate the reasoning about the complexity of software using tools and abstractions which can describe the properties and behavior of computer software. Computer software may often be formally described for the purposes of such analysis by specifying a set of constraints or axioms formalizing the relationships and operation of the software.

Satisfiability Modulo Theories (SMT) is the problem of solving constraints in a combination of domains. Typical domains include linear arithmetic over real numbers and integer linear arithmetic over the integers. Linear programming as exemplified by the well-known Simplex algorithm is a prime example of a solver for Linear arithmetic. A satisfiability (SAT) solver is a procedure that determines satisfiability of propositional formulas.

It may also be useful to reason at the same time about disparate sets of constraints and axioms. Modern theory provers (constraint solvers) have been used in such pursuits. A core problem of Satisfiability Modulo Theories is combining separate theory solvers for a plurality of theories into a combined solver for the union. The manifestation of the problem for a pair of theories $T_1$ and $T_2$, is to produce a combined solver for the union $T_1 \cup T_2$. One may appreciate that a pairwise combination method that works indepdently of the theories may produce an n-way combination method by repeated pairing. The Nelson-Oppen combination method identifies sufficient conditions for combining two theories over disjoint signatures: only (disjunctions of) equalities over shared variables that are implied by one of the theories need to be communicated to the other solver.

Some traditional methods for combining theory solvers rely on capabilities of the solvers to produce all implied equalities or a pre-processing step that introduces additional literals into the search space. Many existing implementations and optimizations of these methods seek to efficiently implement the trigger:

if $T_i \cup \Gamma_i \vdash u \simeq v$ then propagate $u \simeq v$, to exhaustively enumerate all implied (disjunctions of) equalities for a theory $T_i$ and constraints $\Gamma_i$ that are asserted in its context.

Another known method to obtain completeness is by enumerating equalities corresponding to the cross-product of all shared variable pairs and use a SAT solver for non-deterministically choosing a partition based on the cross-product. Common to these methods is that they are pessimistic about which equalities are propagated.

Methods for combining theories and solving the combined theories are known to consume both large amounts of computing resources (space and processor power) as well as time. There can be considerable overhead in space and in expensive theory propagation required by these methods.

BRIEF SUMMARY

Embodiments of the present invention are directed toward combining theories for a plurality of theorem solvers and toward producing and updating models which are satisfiable within one or more theory solvers.

Embodiments include a method for producing a model satisfiable by each of a plurality of theorem solvers. A computer system or processor accesses a model for a first theory solver which is satisfiable in the first theory solver. The computer system or processor determines a set of one or more equalities which are implied by the model. Further, the computer system or processor determines that one of the one or more equalities are not compatible with a second theory solver. The computer system or processor updates the model of the first solver in accordance with the one or more equalities determined not to be compatible with the second solver.

Other embodiments of the present invention include a method of diversifying a model for a theorem solver in order to reduce the number of equalities implied by the model. A computer system or processor determines a freedom interval for a variable within a first model. The computer system or processor chooses a value within the freedom interval. And the computer system or processor executes an update procedure using the chosen value within the freedom interval to produce a second model which is more diverse than the first model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
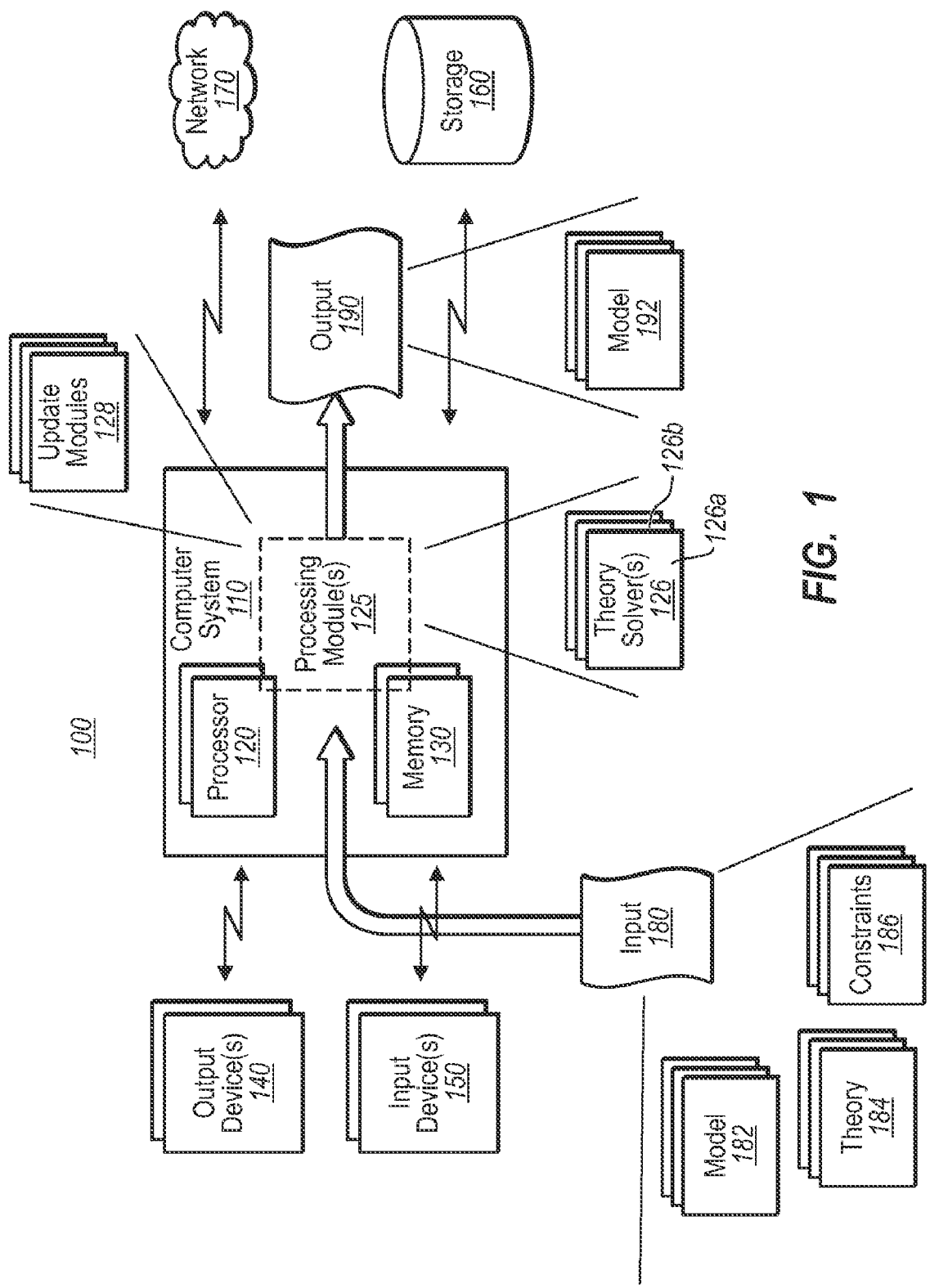
FIG. 1 illustrates an exemplary computer operating environment in which the embodiments described herein may operate.

The present invention extends to embodiments for determining and updating models which satisfy one or more theory solvers. The embodiments of the present invention may comprise a special purpose or general-purpose computer including various computer hardware, various software, and various methods, as discussed in greater detail below.

Embodiments include a method for producing a model satisfiable by each of a plurality of theorem solvers. A computer system or processor accesses a model for a first theory solver which is satisfiable in the first theory solver. The computer system or processor determines a set of one or more equalities which are implied by the model. Further, the computer system or processor determines that one of the one or more equalities are not compatible with a second theory solver. The computer system or processor updates the model of the first solver in accordance with the one or more equalities determined not to be compatible with the second solver.

Other embodiments of the present invention include a method of diversifying a model for a theorem solver in order to reduce the number of equalities implied by the model. A computer system or processor determines a freedom interval for a variable within a first model. The computer system or processor chooses a value within the freedom interval. And the computer system or processor executes an update procedure using the chosen value within the freedom interval to produce a second model which is more diverse than the first model.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

With this description and following claims, a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

An approach to combining separate theories of one or more theory solvers may be by inspecting a candidate model $M_i$ for one of the theories $T_i$ within one of the solvers and propagating all equalities implied by the candidate model to one or more other theory solvers, hedging that other theories will agree. If one or more of the other theory solvers do not agree, then backtracking may be used to fix the model. Backtracking would comprise updating a model to fix the implied equalities which are not satisfiable within another theory. In this fashion, embodiments of the present invention may be based upon a trigger of the form:

if $M_i \vDash T_i \cup \Gamma_i \cup \{u \simeq v\}$ then propagate $u \simeq v$.

In other words, if a model implies that $u \simeq v$ within the theory $T_i$ and the constraints $\Gamma_i$ upon the theory, then propagate the equality $u \simeq v$ to the other theory solvers for checking the compatibility (or satisfiability) of u≃v in the other theory. If u≃v is not satisfiable in one or more of the other theories, then the information would be returned to the first theory solver so that the model $M_i$ may be updated to produce a new model in which u≃v was not an implied equality.

Turning to FIG. 1, a computing environment 100 is shown in which embodiments of the present invention may be practiced. The computing environment 100 includes at least one computer 110 which includes one or more computer processors 120 and computer memory 130. The environment may also include various input devices 150 and output devices 140. Input devices 150 may include keyboards, computer mice and other pointing devices, and other devices as may be known to those in the art. Output devices 140 may include printers, CRT or LCD or other displays, magnetic and optical storage, media access hardware, and all other devices which may be known in the art.

In practicing the invention, the computing environment 100 and the computer 110 may take input 180, perform calculations and manipulations of data and data structures, and produce output 190. Both input and output may be directed to (or from) physical storage devices 160. Such storage devices may include optical storage, magnetic storage, and other physical storage as is known in the art.

The computing environment may also include access to a network 170. As can be appreciated, input and output to the computing system may also occur through the network 170. The network 170 may be any transmission system suitable for use in practicing the invention and would include both wired and wireless systems. Further, the computing environment 100 should be thought to include other processing systems and input and output devices (140 and 150) and storage devices 160 which may be accessible through the network 170.

Figure 2:
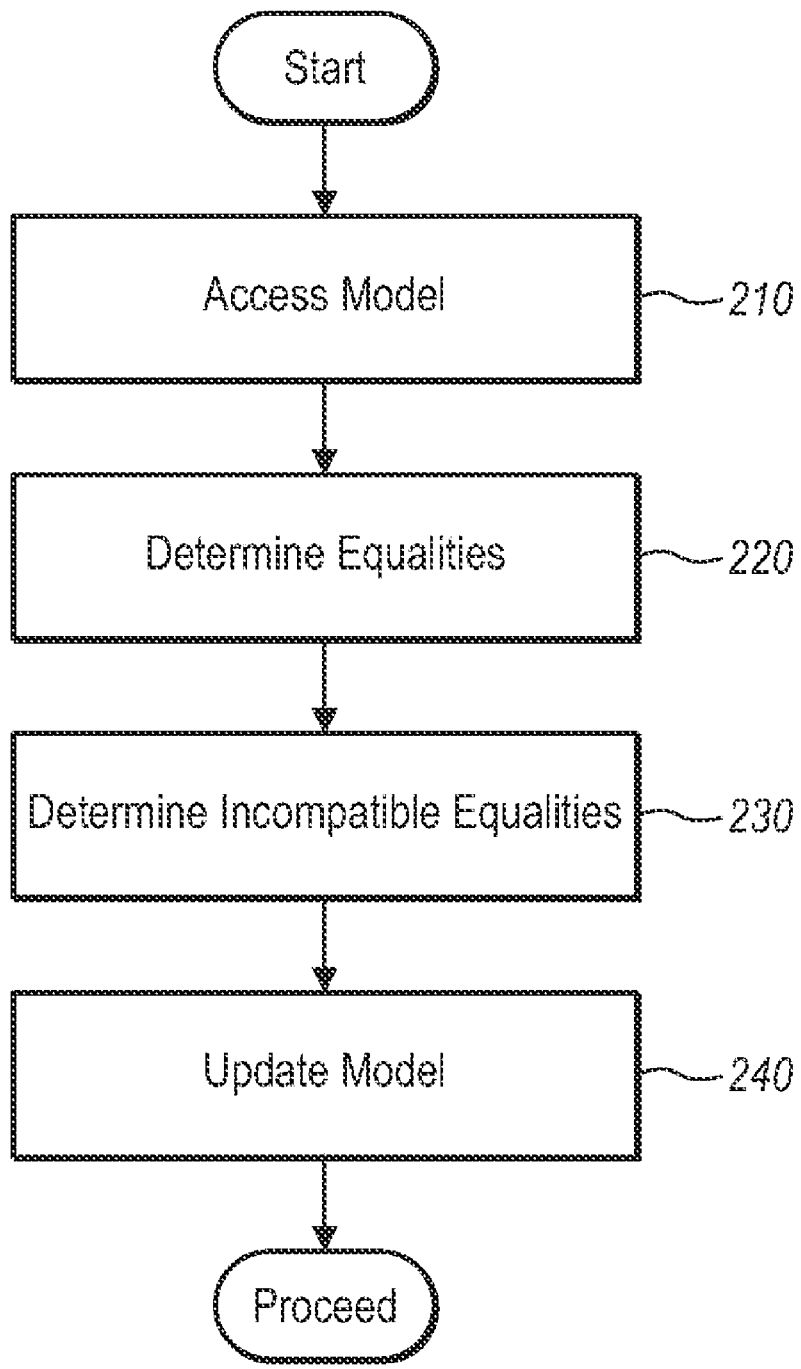
FIG. 2 illustrates a method for producing a model which is satisfiable by each of one or more theory solvers.
Figure 3:
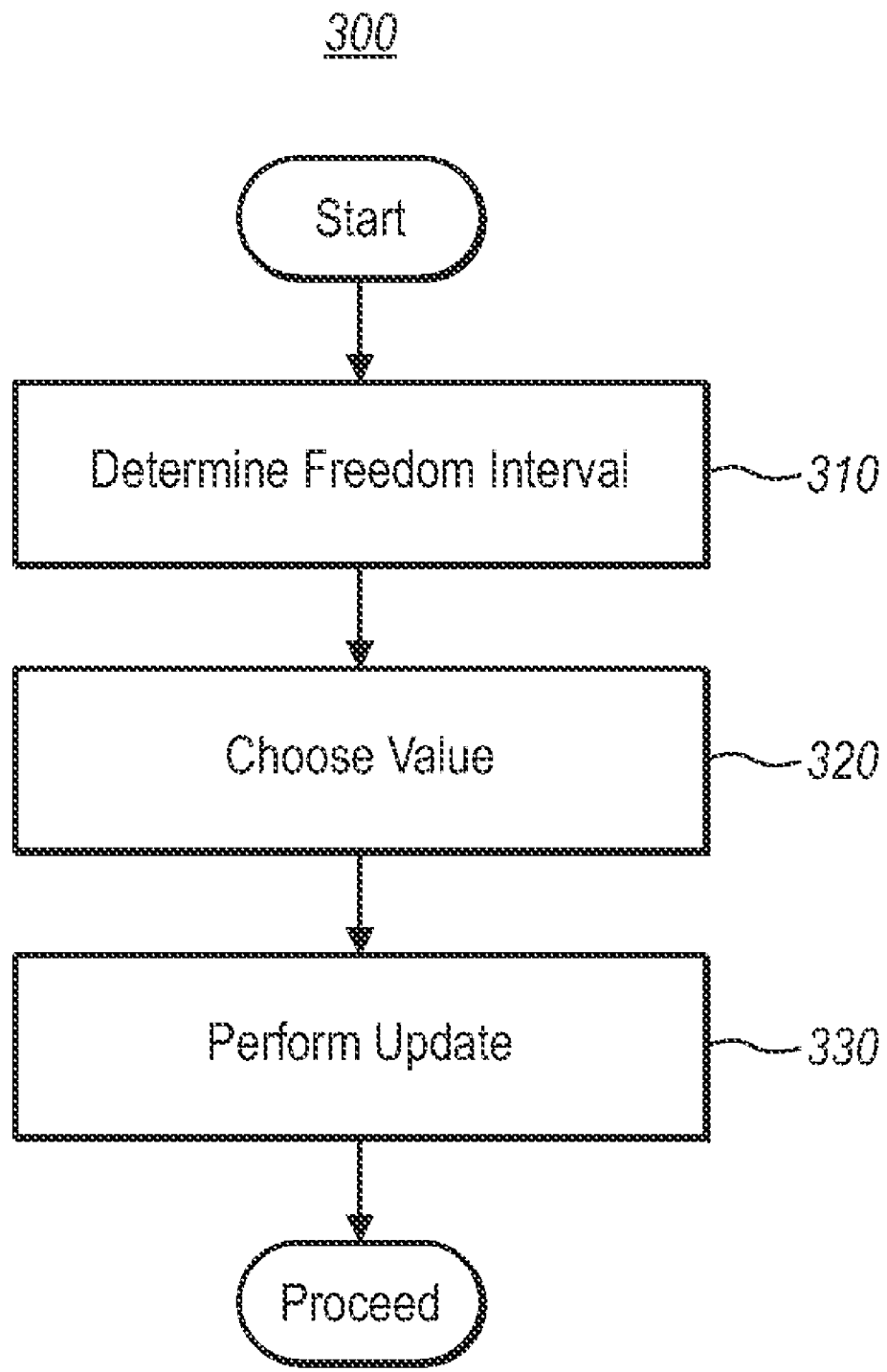
FIG. 3 illustrates a method in a computing environment for diversifying a model for a theory solver in order to reduce the number of equalities implied by the model.

One embodiment of the present invention includes a method 200 as depicted in FIG. 2 for producing a model satisfiable by each of a plurality of theorem solvers. Method 200 may, for instance, be performed in a computing environment 100 as depicted in FIG. 1. For example, a computing system 110 may take a model 182 and a theory 184 as well as constraints 186 as input. The computing system may determine 220 equalities implied by the model 182 in a processing module 125. The processing module may comprise both a computer processor 120 and computer memory 130 and further comprise computer-executable instructions. The processing module(s) 125 may also determine 230 that certain equalities implies by the model are not compatible (or satisfiable) within another model 182 within a theory solver 126. It may be appreciated that the computing system 110 may have access to multiple theory solvers 126 such as theory solver 126a and theory solver 126b.

Although depicted within a single computing system 110, the multiple theory solvers 126 may, in fact, reside within separate computing environments which may be accessible by network 170 or by other means. When an equality implied by a model 182 for a theory solver 126a is determined not to be compatible with another theory solver 126b, the processing module(s) 125 may update the model 182 to produce the output 190 of a new model 192 for the theory solver 126a. In this fashion, a model may be updated so that, ultimately, all equalities implied by the model for a theory solver 126a will be compatible with another theory solver 126b.

Such a method would include accessing 210 a model for a first theory solver which is satisfiable in the first theory solver. For instance, the computer system 110 may access model 182 as input 180. As can be appreciated, the model 182 may also be stored in storage 160 or in any other accessible manner.

The first theory solver may maintain a model through a processing module 125 within the computing environment 100. The model which is satisfiable in the first theory solver may comprise a set of values which correspond to some or all of the variables within the theory. A variable may be a symbol, a function symbol, or other symbol within the theory. When two variables have the same value within a model, it may be said that the two variables (symbols) are equal in that particular model. Such symbols which have the same value in a model may be said to imply an equality, in other words, the two symbols are equal in the model.

The method 200 for producing a model satisfiable by each of a plurality of theorem solvers would also include determining 220 a set of one or more equalities which are implied by the model. For instance, processing module(s) 125 may determine the equalities implied by model 182 for theory solver 126a.

Such implied equalities are as described above. When two (or more) symbols in a model have the same value, it may be said that the model implies the equality of the symbols. The equalities implied by a model may be determined by accessing the model which is stored in storage 160 or may have been provided as input 182 through an input device 150. Determining 220 the equalities may also include enumerating some or all of the symbols within the model and inspecting the assigned values or it may be done by evaluating some mapping of the symbols to a value and recording which symbols are mapped to the same value.

Such determining may be done within a combination of hardware and software such as processor(s) 120, computer memory 130, and processing modules 125 which may comprise both executable code and data. Determining 220 a set of one or more equalities implied by a model may also comprise opportunistic propagation. Opportunistic propagation, as more full described below, allows that equalities than can be inferred without additional expense to a theory solver may be propagated early. In certain situations, such opportunistic propagation may allow (but does not require) faster and more efficient combination of theories in theory solvers.

The method 200 for producing a model satisfiable by each of a plurality of theorem solvers may also include determining 230 that one of the one or more equalities are not compatible with a second theory solver. For instance, processing module(s) 125 may determine that one or more of the equalities implied by model 182 are not compatible with theory solver 126b. It may also be appreciated that the theory solvers 126a and 126b may, themselves be processing modules within the computing system 110 or they may reside on separate or disparate systems which may be communicatively couples through such means as a network 170 or shared memory 130, shared storage 160, or other means as may be appropriate.

Once a set of equalities which are implied by a first theory solver have been determined, it may then be determined 230 which equalities are compatible with a second theory solver and which equalities are incompatible with a second theory solver (i.e., cannot be satisfied within the second theory solver).

Such determining 230 that an inequality is incompatible with a second theory solver may include communicating one or more equalities implied by the model to a second theory solver. The second theory solver may be within the same computing environment 100 as the first theory solver or it may be within a different or separate computing environment. The second theory solver may be accessible by network 170 or may be a processing module 125 (or 126) within the same computing environment. Of course, the equalities implied by the model may be output 190 or may be stored within storage 160 to be later accessed by a second theory solver.

Once it has been determined that one or more of the equalities implied by the model are not compatible with a second theory solver, the method 200 for producing a model satisfiable by each of a plurality of theorem solvers may also include updating 240 the model of the first solver in accordance with the one or more equalities determined not to be compatible with the second solver. Such updating may occur within a processing module 125 or within a more specialized update module 128. For instance, the processing module 125 may update model 182 and produce a new model 192 as output. The new model 192 would be in accordance with the one or more equalities determined not to be compatible with the second solver.

Updating 240 the model of the first solver may comprise backtracking in order to fix the values assigned in a model which imply equalities which cannot be satisfied by or are not compatible with another theory (or theory solver). Updating 240 the module of the first solver may comprise finding new values for variables within a theory and a model and producing a new model for the first solver 126 which does not imply the equalities which are not compatible (i.e., not satisfiable) within a second solver 126.

It may be appreciated that the embodiments as described herein are not necessarily limited to a first theory solver and a second theory solver. It may be appreciated that the embodiments described herein may be applied to any number of solvers in a plurality of theory solvers. Determining 230 that an inequality is incompatible with a second theory solver may also include determining that an inequality is incompatible with one or more solvers taken from a plurality of theory solvers. In such a case, updating 240 the model of the first solver may then comprise updating the mode in accordance with the one or more equalities determined not to be compatible with a plurality of solvers.

In the instance where a plurality of theories or theory solvers are involved, it may be appreciated that determining 230 if equalities are compatible or not compatible for a plurality of solvers and updating 240 a model may be done in, for instance, a sequential (e.g., round robin) fashion, or done in a broadcast fashion where it may be determined 230 if equalities are compatible or not compatible with the plurality of solvers simultaneously. It may be appreciated, of course, that determining 230 if equalities are compatible or not compatible with a plurality of solvers may include communicating the equalities implied by a model to the plurality of solvers. This communication may occur locally within the computing environment 100 may be occur via transmission over a network 170 to other different or separate computing environments.

In some embodiments of the invention, updating 240 the model of the first solver in accordance with at least one equality determined not to be compatible with the second solver (or at least one of a plurality of solvers) may be accomplished using model mutation using freedom intervals. Model mutation using freedom intervals is described in more detail below.

An approach, as described in one embodiment of the present invention, may reduce the number of equalities which are or need to be shared between theory solvers. One particular approach makes use of the observation that, in practice, the number of local inconsistencies is much larger than the number of global (cross theory) inconsistencies. This particular approach would work for both convex and non-convex theories alike.

Each theory $T_i$ maintains a model $M_i$ for $\Gamma_i$, or at times only for a subset of $\Gamma_i$.

M-Propagate: From time to time, if $u^{M_i}=v^{M_i}$, then the theory solver creates the case-split $u \simeq v$. Generally, the positive case would be attempted first.

M-Mutate: A theory solver may change a model $M_i$ to $M_i$ to satisfy newly assigned literals, or to imply fewer equalities.

It is straightforward to integrate this approach with a guided search into a Davis-Putnam-Logemann-Loveland (DPLL) framework. The relevant rules are given by:

M-Propagate:

$$M,\Gamma\|F \Longrightarrow M,\Gamma(u\simeq v)^d\|F \text{ if } u,v \text{ in } V, (u\simeq v) \text{ not in } L$$

$$u^{M_i}=v^{M_i}$$

add $(u \simeq v)$ to L

M-Mutate:

$$M,\Gamma\|F \Longrightarrow M',\Gamma\|F \text{ if } M' \text{ is some variant of } M$$

These transition rules modify triplets of the form M, $\Gamma\|F$, where M is a set of models for theories $T_1, \ldots, T_n$; $\Gamma$ is a set of asserted literals; and F is a set of clauses.

The rule M-Propagate creates a fresh equality literal $(u \square v)^d$ when a model associated with one of the theories implies it, but the equality is not present in the context $\Gamma$. The equality literal is pushed on $\Gamma$, thus propagating the equality to all the theories sharing variables u and v. The tag d on the literal indicates that the literal may be negated during backtracking.

The rule M-Mutate allows changing models during backtracking search. For example, after applying Decide (a rule which guesses a truth assignment to a previously unassigned literal), a new newly assigned literal $l^d$ may not be satisfied in the existing models. I may not be necessary to specify when M-Mutate is applied. For instance, theory solvers are not required to maintain models for their contexts at all times during a search. Models are only required when other case splits have been attempted. For example, when using linear programming for an integer linear programming problem, a simplex tableau may choose to delay introducing Gomory cuts to obtain an integer interpretation until other constraints have been propagated.

In other embodiments, optimizations may be employed to further reduce the number of case splits when combining theories. Let $R_M$ be an equivalence relation on V such that $R_M(u, v)$ iff $u^M=v^M$. Let classes(R) be the set of equivalence classes induced by R. Optimizations in particular embodiments of the invention include:

Opportunistic equality propagation: Equalities which may be inferred without additional expense to a theory solver are propagated eagerly. (An example of opportunistic equality propagation is given below.)

Postponing model-based equality propagation: Applying the rule M-Propagate may be delayed until case splits on already existing literals have been performed.

Model mutators: Model mutation may use a function $\delta(M_k)$ that returns a more diverse model. More formally, $|\text{classes}(R_{M_k})| \leq |\text{classes}(R_{\delta(M_k)})|$ (i.e., the equivalence classes of the new model are fewer than the equivalence classes of the original model).

One particular example of an embodiment of the present invention uses a theory solver for linear arithmetic. Integer linear arithmetic may be based on a Simplex Tableau of the form:

$$x_i \simeq \sum_{x_j \in N} A_{ij} x_j \quad x_i \in B,$$

where B and N denote the set of basic and non-basic variables, respectively. In addition to this tableau, the solver state stores upper and lower bounds $l_i$ and $u_i$ for every variable $x_i$ and a mapping $\beta$ that assigns a rational value $\beta(x_i)$ to every variable $x_i$. The bounds on nonbasic variables are always satisfied by $\beta$, that is, the following invariant is maintained:

$$\forall x_j \in N, l_j \leq \beta(x_j) \leq u_j.$$

Bounds constraints for basic variables are not necessarily satisfied by $\beta$, so for instance, it may be the case that $l_i > \beta(x_i)$ for some basic variable $x_i$, but pivoting steps, as are known in the art, can be used to fix bounds violations, or detect an infeasible tableau. It may be appreciated that the current model for the simplex solver is given by $\beta$. Determining the equalities implied by $\beta$ is simple: enumerate all the values of $\beta(x_i)$, inserting each value into a hash table. The expected time of enumerating, and thereby determining, all equalities is then $O(|B \cup N|)$.

In certain embodiments, the equalities which may be determined to be compatible or not compatible in a second theory solver may be those chosen according to opportunistic propagation.

For opportunistic equality propagation, a variable $x_i$ is fixed iff $l_i = u_i$, a linear polynomial $\Sum_{x_j \in V} a_{ij} x_j$ is fixed iff for every $x_j \in V$, $x_j$ is fixed or $a_{ij} = 0$. Given a linear polynomial $P = \Sum_{x_j \in V} a_{ij} x_j$, we use $\beta(P)$ to denote $\Sum_{x_j \in V} a_{ij} \beta(x_j)$.

*FixedEq:*

$$l_i \leq x_i \leq u_i, l_j \leq x_j \leq u_j \Rightarrow x_i \simeq x_j \text{ if } l_i = u_i = l_j = u_j$$

*EqRow:*

$$x_i \simeq x_j + P \Rightarrow x_i \simeq x_j \text{ if } P \text{ is fixed, and } \beta(P) = 0$$

*EqOffsetRows:*

$$\begin{matrix} x_i \simeq x_k + P_1 \\ x_j \simeq x_k + P_2 \end{matrix} \Rightarrow x_i \simeq x_j \text{ if} \begin{cases} P_1 \text{ and } P_2 \text{ are fixed, and} \\ \beta(P_1) = \beta(P_2) \end{cases}$$

*EqRows:*

$$\begin{matrix} x_i \simeq P + P_1 \\ x_j \simeq P + P_2 \end{matrix} \Rightarrow x_i \simeq x_j \text{ if} \begin{cases} P_1 \text{ and } P_2 \text{ are fixed, and} \\ \beta(P_1) = \beta(P_2) \end{cases}$$

The rule FixedEq may be implemented efficiently by using a mapping from values to fixed variables, the second rule may be checked when a row is updated during a pivoting step.

The rule EqOffsetRows is a simpler and less expensive version of EqRows. It may be implemented using a mapping $(x_k, v) \mapsto x_i$, where $x_k$ and $x_i$ are variables, and $v$ is a value. In one implementation, the first three rules are eagerly applied, and the last one is only applied before M-Propagate. Fixed variables may also be removed from the basis.

It may be appreciated that it may be possible that the above rules can miss some equalities implied by a model. For instance, from the set of constraints:

$$x \simeq y+w+s,$$

$$z \simeq w+s,$$

$$0 \leq z,$$

$$w \leq 0, \text{ and}$$

$$0 \leq s \leq 0,$$

the rules, above, will detect the implied equality $z \simeq w$, but they will miss the equality $x \simeq y$ because z is not a fixed variable. However, a bound propagation technique may be used to imply the bound $0 \leq w$, thereby making w a fixed variable, and thereby enabling the application of the rule EqRow.

Other embodiments of the present invention includes a method 300 for diversifying a model for a theory solver to reduce the number of equalities implied by the model. This, as may be appreciated, may (but is certainly not required to) produce the benefit of reducing the number of equalities which may be propagated to another theory solver or may be determined to be compatible or not compatible with another solver. Particular embodiments applying such a method may be termed model mutation using freedom intervals.

The method for diversifying a model for a theory solver to reduce the number of equalities implied by a model includes determining 310 a freedom interval for a variable within a first model. For instance, the processing module 125 may inspect a model 182 and determine a freedom interval for a variable within that model.

The determining may be performed in a computing environment 100 upon a computing system 110. Such determining may be accomplished in processing modules 125 which are a combination of computer hardware and executable code being executed on processors 120 with data and code stored in memory 130. A freedom interval may be any numerical interval in which any value is a value compatible with and allowable by the model.

Determining 310 a freedom interval may, in some embodiments, comprise determining an upper bound and a lower bound for a variable within a model. For instance, if in some model the variable x could be any value less than or equal to 5 but equal to or greater than 1, then the freedom interval for x may be determined 310 to be the interval (1, 5) as x could take any value within the interval between the upper and lower bounds, 5 and 1, respectively.

Once a freedom interval has been determined for a variable within a model, the method includes choosing 320 a value within the freedom interval. For instance the processing module 125 of computing system 110 may choose a value within the freedom interval determined previously. Such values may be stored in memory 130, storage 160 or, possible, produced as output 190 for use as input later in another process.

Choosing 320 a value within the freedom interval may be accomplished within a computing environment 100 by an automated process executing within a processing module 125 or, in some embodiments, may be chosen in a manual fashion from a lookup table or other intervention.

Choosing 320 a value may, in some embodiments, comprise maintaining and/or storing a mapping of each of one or more of the variables within the theory or model to a value. Such a mapping may be denoted $\beta(x_j)$ where $v = \beta(x_j)$ is the mapping of $x_j$ to the specific value v. This mapping may be a function comprising executable code executing within a processing module 125 or it may be a lookup function which retrieves values from storage 160 or memory 130.

It may be appreciated that such a mapping β of variables within a theory (or theory solver) may comprise a model for the theory. In other words, a mapping from the variables within a theory to values which are satisfiable within and compatible with the theory constitutes a particular model for that theory.

The method for diversifying a model for a theory solver to reduce the number of equalities implied by a model also includes executing 330 an update procedure using the chosen value within the freedom interval to produce a second model. For instance, the processing module 125 within computing system 110 may use the value determined previously (retrieving it from memory 130, storage 160, or the like) and updating the model 182 to produce a new model 192 as output 190.

In some embodiments, the second model which is produced by executing 330 the update procedure produces a new model which is more diverse than the first model. A model is more diverse than another model if the number of equivalence classes implied by the model is smaller than the number of equivalence classes implied by the other model. Equivalence classes, as may be appreciated, are those equalities implied by the values mapped to the variables within the theory.

In other embodiments, executing 330 an update procedure may comprise choosing a new value for a variable with the new value being within the freedom interval determined 310 for that variable. As may be appreciated, it may be advantageous in particular instance that choosing 320 a value within the freedom interval comprises choosing a value which reduces the magnitude of equivalence classes for a model. For example, it may be advantageous that, if in one model x=4, y=6, and the freedom interval for z is (5, 7), then choosing the value 6 for z would result in there being two equivalence classes instead of three (e.g., [{x}, {y, z}] instead of [{x}, {y}, {z}]) than if any other value of z within the freedom interval for z were chosen.

For example, in one embodiment of the method 300 for diversifying a model for a theory solver to reduce the number of equalities implied by a model, the freedom of a non-basic variable $x_j$ within a theory may be defined as the interval $[L_j, U_j]$, where:

$$L_j = \max \begin{pmatrix} \left\{ \beta(x_j) + \dfrac{l_i - \beta(x_i)}{a_{ij}} \;\middle|\; a_{ij} > 0 \right\} \cup \\ \left\{ \beta(x_j) + \dfrac{u_i - \beta(x_i)}{a_{ij}} \;\middle|\; a_{ij} < 0 \right\} \cup \\ \{l_j\} \end{pmatrix}$$

$$U_j = \min \begin{pmatrix} \left\{ \beta(x_j) + \dfrac{u_i - \beta(x_i)}{a_{ij}} \;\middle|\; a_{ij} > 0 \right\} \cup \\ \left\{ \beta(x_j) + \dfrac{l_i - \beta(x_i)}{a_{ij}} \;\middle|\; a_{ij} < 0 \right\} \cup \\ \{u_j\} \end{pmatrix}$$

Less formally, if β satisfies all rows and bound constraints, then β will also satisfy them after executing update($x_j$,v) for any value v in the interval $[L_j, U_j]$, where the update procedure may be defined as:
   update($x_j$,v):
      for each $x_i \in B$, $\beta(x_i) := \beta(x_i) + a_{ij}(v - \beta(x_j))$
      $\beta(x_j) := v$
Freedom intervals may be used to produce a more diverse mapping of variables to values, β, without performing any pivoting operation. A simple greedy heuristic may be quite effective: for each non-basic variable $x_j$, execute 330 update ($x_j$,v), if there is a value $v \in [L_j, U_j]$ such that $|\text{classes}(R_{\beta'})| < |\text{classes}(R_\beta)|$, where β' denotes β after the update operation.

It may be appreciated that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising at least one processor operatively coupled to system memory, a method for combining the models of a plurality of theory solvers in order to produce a model which is satisfiable by each of the plurality of theory solvers, the method comprising:
   a processor accessing a model for a first theory solver which is satisfiable in the first theory solver;
   the processor determining a set of one or more equalities which are implied by the model, comprising determining that each equality in the set of one or more equalities include a plurality of symbols that have the same value in the model;
   the processor determining that at least one of the set of one or more equalities are not compatible with a second theory solver, comprising communicating one or more equalities from the set of one or more equalities to the second theory solver; and
   the processor updating the model in accordance with at least one equality determined not to be compatible with the second solver to create an updated model, wherein updating comprises backtracking to fix values assigned in the model which imply equalities which are not compatible with the second theory solver, such that the updated model is satisfiable in both the first theory solver and the second theory solver.

2. The method of claim 1, wherein determining a set of one or more equalities which are implied by the model comprises opportunistic propagation.

3. The method of claim 1, wherein determining that at least one of the one or more equalities are not compatible with a model of a second theory solver further comprises determining that one of the one or more equalities is not compatible with a plurality of theory solvers.

4. The method of claim 1, wherein determining that at least one of the one or more equalities are not compatible with a second theory solver comprises communicating one or more equalities to the second theory solver.

5. The method of claim 1, wherein updating the model of the first solver in accordance with the at least one equality determined not to be compatible with the second solver comprises model mutation using freedom intervals.

6. The method of claim 1, further comprising:
   the processor diversifying the updated model in order to reduce the number of equalities implied by the updated model, comprising:
      determining a freedom interval for a variable within the updated model;
      choosing a value within the freedom interval; and
      executing an update procedure, using the chosen value within the freedom interval, the update procedure producing a second model.

7. The method of claim 6, wherein determining a freedom interval comprises determining an upper bound and a lower bound.

8. The method of claim 6, further comprising storing a mapping of each of one or more variables within a theory solver to a value.

9. The method of claim 8, wherein the mapping of each of one or more variables comprises a model for a theory solver.

10. The method of claim 6, wherein executing an update procedure produces a second model more diverse than the updated model.

11. The method of claim 10, wherein executing an update procedure comprises choosing a new value for a variable, the value being within the freedom interval.

12. The method of claim 6, wherein choosing a value within the freedom interval comprises choosing a value which reduces the magnitude of equivalence classes for a model.

13. One or more physical computer storage media having stored thereon computer-executable instructions which, when executed by one or more computer processors, perform a method for combining the models of a plurality of theory solvers in order to produce a model which is satisfiable by each of the plurality of theory solvers, the method comprising:
   a computer system accessing a model for a first theory solver which is satisfiable in the first theory solver, the computer system including the one or more computer processors;
   the computer system determining a set of one or more equalities which are implied by the model, comprising determining that each equality in the set of one or more equalities include a plurality of symbols that have the same value in the model;
   the computer system determining that one of the set of one or more equalities are not compatible with a second theory solver, comprising communicating one or more equalities from the set of one or more equalities to the second theory solver; and
   the computer system updating the model in accordance with the one or more equalities determined not to be compatible with the second solver to create an updated model wherein updating comprises backtracking to fix values assigned in the model which imply equalities which are not compatible with the second theory solver, such that the updated model is satisfiable in both the first theory solver and the second theory solver.

14. The one or more physical computer storage media of claim 13, wherein determining a set of one or more equalities which are implied by the model comprises opportunistic propagation.

15. The one or more physical computer storage media of claim 13 wherein updating the model of the first solver in accordance with the equalities determined not to be compatible with the second solver comprises model mutation using freedom intervals.

16. The one or more physical computer storage media of claim 13, wherein determining that one of the one or more equalities are not compatible with a model of a second theory solver comprises determining that one of the one or more equalities are not compatible with a plurality of theory solvers.

17. The one or more physical computer storage media of claim 13, further comprising storing a data structure which identifies a mapping of variables of a theory to values corresponding to a model.

18. A computer system comprising:
   one or more processors; and
   one or more storage media having stored computer-executable instructions that, when executed by the one or more processors, cause the computer system to perform a method, comprising:
      the computer system accessing a model for a first theory solver which is satisfiable in the first theory solver;
      the computer system determining a set of one or more equalities which are implied by the model, comprising determining that each equality in the set of one or more equalities include a plurality of symbols that have the same value in the model;
      the computer system determining that one of the set of one or more equalities are not compatible with a second theory solver, comprising communicating one or more equalities from the set of one or more equalities to the second theory solver; and
      the computer system updating the model in accordance with the one or more equalities determined not to be compatible with the second solver to create an updated model, wherein updating comprises backtracking to fix values assigned in the model which imply equalities which are not compatible with the second theory solver, such that the updated model is satisfiable in both the first theory solver and the second theory solver.

19. The method of claim 1, wherein backtracking to fix values includes finding new values for symbols within the model and including the new values in the updated model, wherein the updated model refrains from implying equalities which are incompatible with the second solver.

20. The method of claim 1, wherein the method further comprises updating the updated model using a Davis-Putnam-Logemann-Loveland (DPLL) framework.

* * * * *